Oct. 24, 1939.   G. IMBAULT   2,177,567
METHOD OF FIXING FASTENING PIECES TO METALLIC CABLES
Filed May 2, 1936   3 Sheets-Sheet 1

Oct. 24, 1939.  G. IMBAULT  2,177,567
METHOD OF FIXING FASTENING PIECES TO METALLIC CABLES
Filed May 2, 1936  3 Sheets-Sheet 2

Oct. 24, 1939.  G. IMBAULT  2,177,567
METHOD OF FIXING FASTENING PIECES TO METALLIC CABLES
Filed May 2, 1936  3 Sheets-Sheet 3

Patented Oct. 24, 1939

2,177,567

UNITED STATES PATENT OFFICE 2,177,567

METHOD OF FIXING FASTENING PIECES TO METALLIC CABLES

Georges Imbault, Paris, France

Application May 2, 1936, Serial No. 77,591
In France May 4, 1935

3 Claims. (Cl. 24—1)

The present invention relates to the fixation of fastening pieces or members on cables made of a plurality of metallic wires. These cables are employed in industry either for supporting statical loads (cables of suspension bridges, for instance) or for transmitting movements (transmission cables, winch cables or the like). It may be necessary to fasten to the cable, either at its end or at any intermediate point thereof, elements intended to transmit stresses thereto or to receive stresses therefrom. The latter generally has a component parallel to the cable which tends to produce a sliding movement of the fastening piece along the cable. The fastening piece may also be intended to play the part of a stop in the case of moving cables. In this case also it undergoes stresses which tend to produce a sliding displacement thereof with respect to the cable. The adhesion of the fixation piece to the cable must be sufficient for preventing any displacement thereof with respect to the cable in service.

Up to the present time, fastening pieces for cables generally consisted of collars or rings strongly tightened around the cable, the strength of the fixation being then ensured chiefly by the frictional resistance of the piece against sliding on the cable, and only the external layer of the cable cooperates with the fastening piece to keep it in position. With such an arrangement, it is impossible to obtain a very secure fixation, the more so as the frictional resistance can be effective only at the cost of a displacement of the fastening piece along the cable. It is therefore impossible to ensure in this way a perfect immobilization of the fastening piece.

It has been suggested to mount the fastening piece about a local spreading or swelling of the cable forming a stop for the fastening piece. This arrangement has the advantage of opposing to the forces parallel to the cable a resistance which, contrary to what takes place in the case of frictional resistances, is actually exerted on pieces in the state of rest and permits of obtaining a perfect immobilization.

In known systems of this kind, the local widening or spreading of the cable is obtained either by means of wedges or similar blocking means fixed on the outside of the cable, or by means of additional pieces inserted between the elementary wires or strands of the cable. But these systems have many drawbacks. In addition to the difficulty of mounting the wedges or additional members in question, the latter are themselves maintained in position only by frictional resistances. Therefore, their immobility cannot be perfect and they can be subjected only to relatively low stresses.

The object of the present invention is to provide a system which avoids these drawbacks, and which is to include, at the place where the fastening piece is to be fixed, a local widening or spreading of the cable, forming a stop for the fastening piece, without making use of wedges or additional pieces, which are liable to be displaced under the effect of the load.

The essential feature of the present invention consists in moving apart from one another, at the place where the fastening piece is to be fixed, the wires or strands that form the cable, so as to form a local spreading or swelling of the cable. Around this spreading and on the inside thereof, a suitable material is cast, which fills up all the intervals formed between the wires or strands, adhering thereto and making them integral with one another. There is thus formed a kind of sleeve surrounding the cable and at the same time intimately connected with each of the wires or strands that constitute the elements of the cable. This sleeve may be reinforced or completed by external hooping means. It may constitute the fastening piece itself, or the latter may be mounted on said sleeve.

It will be readily understood that with this arrangement all the wires or all the strands of the cable cooperate in the adhesion of the fastening piece on the cable. Furthermore, the part of the cable which is spread or expanded and embedded in the material forms a stop which acts in a positive and efficient manner to prevent any displacement of the fastening piece along the cable under the action of stresses parallel thereto.

The cement that is employed may consist of a substance which is fusible at a temperature sufficiently low for avoiding any risk of injuring the cable, said substance being sufficiently strong after solidification. In particular, according to the present invention, it is advantageous to make use of metals or alloys of the kind called "antifriciton metal", for instance alloys of lead and antimony, alloys of lead, zinc and tin or the like. It is also possible to make use of liquid or pasty matters capable of setting, such as hydraulic material proper. For instance the cement part may be injected under pressure into a suitable mold disposed around the expanded portion of the cable.

The invention further includes an application of the above described system of fixation, in the case of cables for suspension bridges, conveyers and the like, for fixing on such cables mooring elements capable of replacing or supplementing the normal mooring device with a view to increasing the safety of the plant. The usual mooring arrangements of cables are obtained by surrounding the free end of the cable in a metallic socket rigidly connected, through tie-rods, to a foundation or a suitably chosen fixed part of the plant. These anchoring devices, which cannot be easily reached, escape normal supervision and deterioration thereof is often revealed only when an accident occurs.

According to the present invention, the mooring of the cable is obtained by means of one or several fastening pieces each fixed, on the one hand to the cable in the manner above explained and which constitute an essential feature of the invention, and, on the other hand to the anchoring part of the plant, for instance by means of tie-rods. Such a system is, in particular well adapted to the reinforcement of existing moorings. In this case, the fastening pieces are connected to the anchoring element of the plant through the organs that serve for the fixation of the socket of the main mooring device to said element. With such an arrangement, the supplementary mooring or moorings do not increase the space occupied by the anchoring means and it is therefore possible to multiply the number of said supplementary moorings, in case of necessity. Furthermore, these supplementary moorings can easily be combined with an already existing mooring system and they can be devised in such manner as to support, under ordinary working conditions, a portion of the load applied to the normal mooring system. Therefore in this case they constitute, in addition to a safety system, a reinforcing system for an existing plant.

Other features of the present invention will result from the following detailed description of specific embodiments thereof.

Preferred embodiments of the present invention will be hereinafter described, with reference to the accompanying drawings, given merely by way of example, and in which:

Fig. 1 diagrammatically shows a device adapted to be used to spread the elements of the cable apart at the desired place on the cable;

Figure 8:
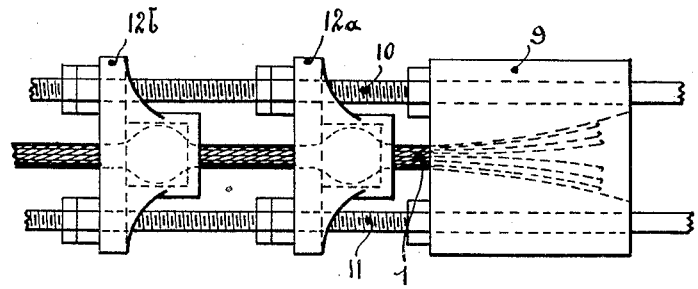
Figure 9:
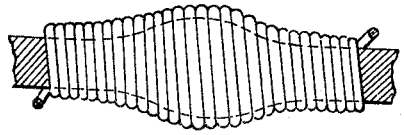

Fig. 8 diagrammatically shows a device including a plurality of mooring means associated with a single cable;

Figure 9 shows in perspective, a sleeve, which may be constructed of any of the materials named above, which is protected by a wire wound around it and secured at the ends.

Figure 1:
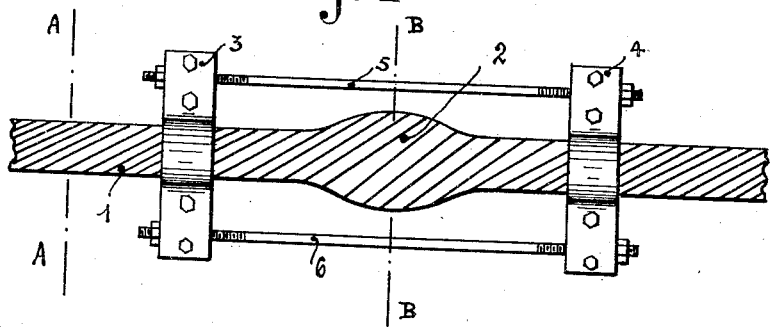

Fig. 1 shows how it is possible to produce, at a predetermined point 2 of cable 1, the spreading of the wires or strands of the cable around which the fastening piece shall be fixed. The cable is caught, on either side of said point 2 between two pairs of jaws, respectively. Jaws 3 are connected with jaws 4 through threaded rods 5 and 6 cooperating with nuts for forcing the two pairs of jaws toward each other. By tightening said bolts the two pairs of jaws are brought toward each other. The compressive action in opposite directions they exert on the portion of the cable extending between these two pairs of jaws cause the median part of said portion of the cable to swell, and wires or strands of the cable to move apart from one another.

Figure 2:
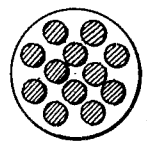
Fig. 2 is a sectional view on the line A—A of Fig. 1.
Figure 3:
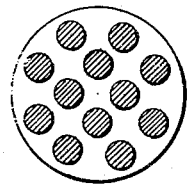
Fig. 3 is a sectional view on the line B—B of Fig. 1.

Fig. 2 is a section of the cable in a portion thereof that is not subjected to the deformation above mentioned. Fig. 3 shows the spacing apart of the cable elements (wires or strands) obtained by the action of the device of Fig. 1.

Figure 4:
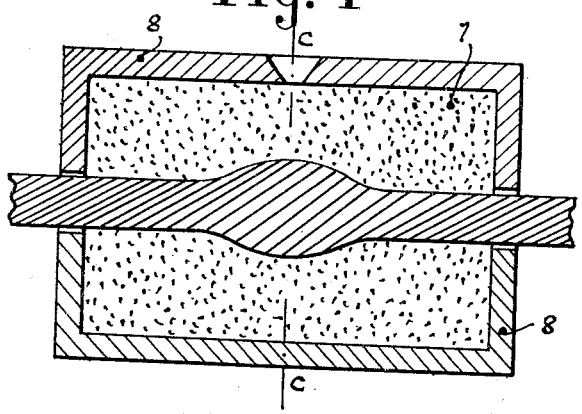
Fig. 4 is a longitudinal sectional view of a fastening piece made according to the present invention.

The material is then poured into a suitable mold surrounding portion 2 of the cable, and penetrates into all the intervals existing between the elements (wires and strands) of the cable. When set or solidified, this material forms the sleeve 7 shown in Figs. 4 and 5, which constitutes the fastening piece. It is then possible to remove the device for spreading portion 2 of the cable and also the mold containing the material.

Following the removal of the mold excess thickness of the sleeve may be removed or retained as desired.

Figure 5:
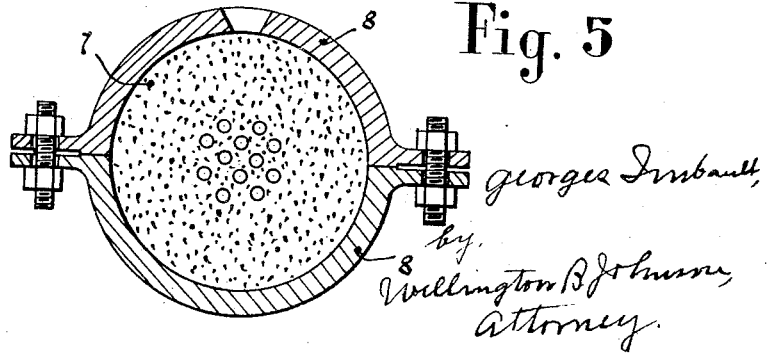
Fig. 5 is a cross sectional view of this piece on the line C—C of Fig. 4.

When a fusible metallic alloy or metal is to be employed, to form a sleeve, a tubular metallic mold such as is shown in cross section in Figure 5, preferably of steel, is secured around the portion of the cable where the wires are separated. This is then filled with the metal or alloy in molten condition, which is then permitted to cool and harden, thus forming the sleeve. The steel mold may then be removed, or allowed to remain adding its power to that of the metal. The mold may be heated even up to the fusing point of the alloy before that is poured into it, consequently by its contraction on cooling it will have a "hooping" that is a compressing effect upon the sleeve.

Besides, the sleeve may be hooped in any other suitable manner, for instance by means of steel wires wound and stretched on the periphery thereof.

The system the principle of which has been above described permits of giving the fastening pieces a power of adhesion as high as it is desired. Experiments have shown that it is possible to provide, with this system, fixations sufficient for withstanding tensile stresses of the same order of magnitude as those which would break the cable.

For instance, experiments were made with a cable of a diameter of 23 mms. made of steel of a breaking strength ranging between 120 and 130 kgs. per square millimeter. The total breaking load ranged between 42 and 43 metric tons. The cement employed was an alloy of lead and antimony.

A mere sleeve without hooping, fixed on the cable according to the invention and subjected subsequently to gradual tensile stresses underwent a first deformation only for a tension of 10 metric tons.

The same sleeve, hooped by means of steel wires wound thereon resisted tensile stresses up to a value of 20 metric tons.

Finally, the same sleeve, reinforced and hooped by means of a tubular steel mold, resisted up to a limit of 41 tons, that is to say a tension substantially equal to the breaking load of the cable.

The system according to the present invention has the further advantage of being applicable to any point of the cable and at any time whatever.

It can be applied as well while the cable is being manufactured as when said cable is in service.

The system according to the invention can also be applied to any kind of metallic cables.

Figure 6:
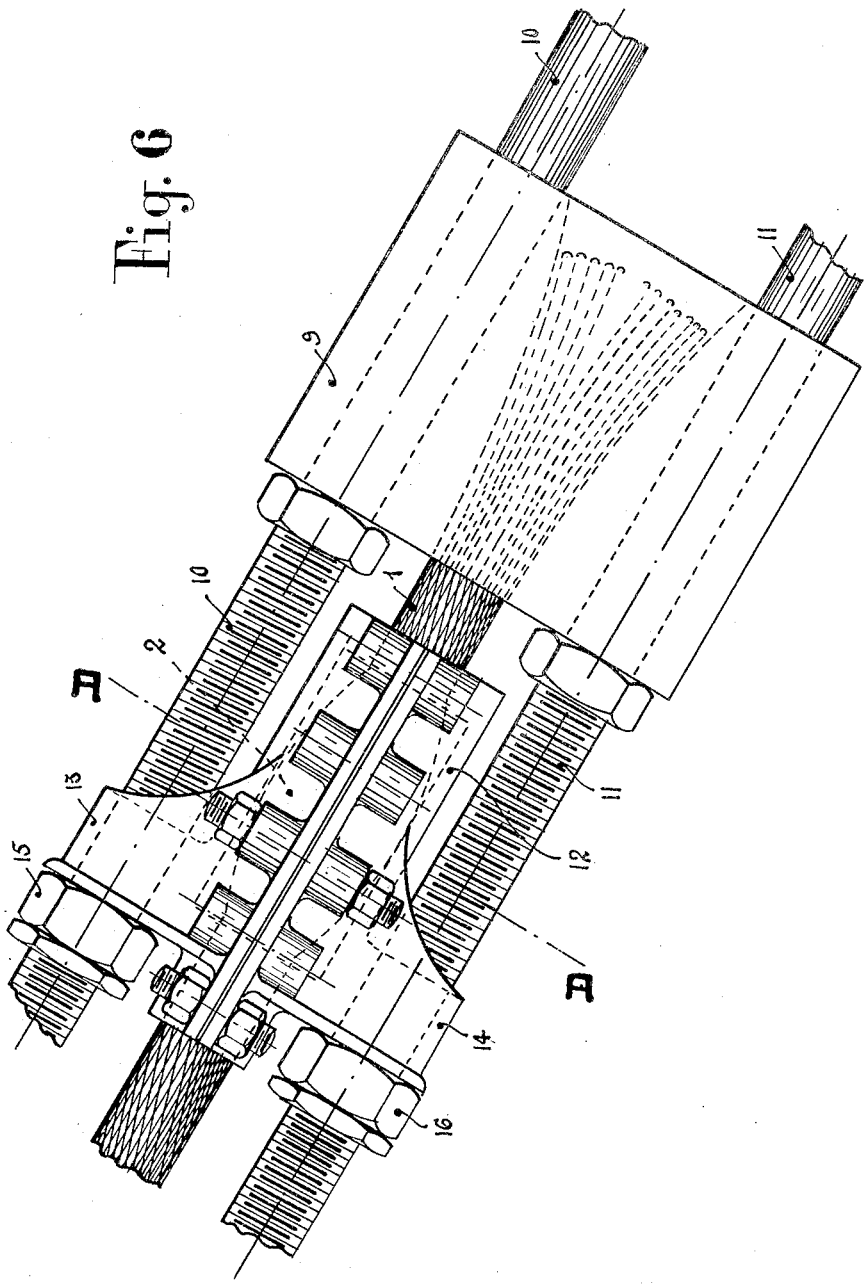
Fig. 6 is an elevational view of a mooring device for use in connection with a cable of a suspension bridge, for instance.
Figure 7:
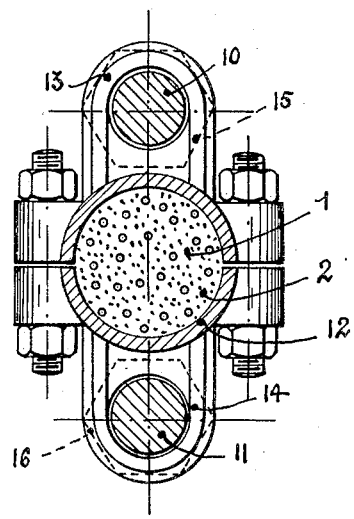
Fig. 7 is a sectional view on the line D—D of Fig. 6.

Figs. 6 and 7 show a cable 1 provided with supplementary mooring means the fixative of which to the cable is made according to the present invention. The usual mooring includes a metallic socket 9 with an internal hole in which the free end of the cable, suitably spread, is enclosed. A fusible metal is cast in this hole for securing the cable to the body of the socket. The latter is fixed to the mooring element through tie rods 10 and 11 which extend throughout the socket and project therefrom to a distance sufficient for receiving the supplementary mooring system.

The latter includes a fastening piece 12 consisting of a sleeve made of two portions secured to each other by means of bolts and fixed about a thickened portion 2 of the cable. On the inside of the sleeve acting as a hooping element, a fusible metal or alloy has been cast as above explained. Sleeve 12 and the metal and the wires of the cable thus form a whole and their mutual adhesion is as complete as possible. Sleeve 12 carries two stirrups 13 and 14 provided with passages for tie-rods 10 and 11. The securing of piece 12 with the tie-rods is obtained by means of nuts 15 and 16 which are screwed on the threaded portions of the tie-rods. By suitably adjusting these nuts, it is possible to have the whole of the load applied to the mooring socket 9, whereby the supplementary mooring device supports this load only in the case of the main mooring device being broken. It is also possible to arrange the parts in such manner that, under normal conditions of working, a portion of the load is already applied to the supplementary mooring device with a view to relieving socket 9.

Instead of a single supplementary safety device, it is possible, according to the invention, to provide several of them, fixed in the same manner to the cable and to the mooring tie-rods of the socket. Such an arrangement is shown diagrammatically by Fig. 8. The cable is provided with two fastening pieces 12a, 12b, analogous in structure to fastening piece 12 of Figs. 6 and 7. Both of these fastening pieces are attached, by means of nuts, to the threaded rods which serve to moor the socket 9 to the foundation element of the plant. The nuts are, for instance, adjusted in such manner that, if socket 9 happens to break, the load is transferred to piece 12a and if this last mentioned piece also happens to break the load is then transferred to piece 12b.

In the case in which the supplementary mooring system is to be fitted on an existing anchoring, the existing tie-rods are generally not long enough for receiving the supplementary mooring elements. But it is very easy to prolong these tie-rods by means of rods fixed thereto by means of coupling sleeves.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. The method of formation of a solid protuberance between the extremities of a multi-wire metallic cable which comprises, securing clamps upon the cable at both sides of the place where the protuberance will be formed, bringing the clamped portions of the cable closer together, whereby the cable between them is expanded and the wires separated, placing a mold around this expansion, casting therein and therearound a substance which will harden and adhere to the wires, permitting this substance to harden, and then removing the clamps.

2. The method of claim 1 as modified in that the substance which will harden is a metallic alloy of low melting point.

3. The method of claim 1 as modified in that the substance which will harden is hydraulic cement.

GEORGES IMBAULT.